United States Patent
Chang et al.

(10) Patent No.: US 8,411,927 B2
(45) Date of Patent: Apr. 2, 2013

(54) MARKER DETECTION IN X-RAY IMAGES

(75) Inventors: Ti-chiun Chang, Princeton Junction, NJ (US); Yunqiang Chen, Plainsboro, NJ (US); Michelle xiaohong Yan, Princeton, NJ (US); Tong Fang, Morganville, NJ (US)

(73) Assignee: Siemens Aktiengesellschaft, München (DE)

( * ) Notice: Subject to any disclaimer, the term of this patent is extended or adjusted under 35 U.S.C. 154(b) by 310 days.

(21) Appl. No.: 12/898,018

(22) Filed: Oct. 5, 2010

(65) Prior Publication Data

US 2011/0103674 A1    May 5, 2011

Related U.S. Application Data

(60) Provisional application No. 61/256,082, filed on Oct. 29, 2009.

(51) Int. Cl.
*G06K 9/00* (2006.01)
(52) U.S. Cl. ........ 382/132; 378/163; 382/128; 382/129; 382/130; 382/131; 382/100
(58) Field of Classification Search .......... None
See application file for complete search history.

(56) References Cited

U.S. PATENT DOCUMENTS

| | | | |
|---|---|---|---|
| 7,904,187 B2 * | 3/2011 | Hoffberg et al. | 700/83 |
| 2009/0216111 A1 * | 8/2009 | Weese et al. | 600/424 |
| 2010/0104167 A1 * | 4/2010 | Sakaguchi et al. | 382/132 |

* cited by examiner

*Primary Examiner* — Bhavesh Mehta
*Assistant Examiner* — Shefali Goradia
(74) *Attorney, Agent, or Firm* — Donald B. Paschburg; F. Chau & Associates, LLC

(57) ABSTRACT

A method for detecting markers within X-ray images includes applying directional filters to a sequence of X-ray image frames. Marker candidate pixels are determined based on the output of the directional filters. Candidate pixels are grouped into clusters and distances between each possible pair of clusters is determined and the most frequently occurring distance is considered an estimated distance between markers. A first marker is detected at the cluster that most closely resembles a marker based on certain criteria and a second marker is then detected at a cluster that is the estimated distance from the first marker. The pair of first and second marker detections is scored to determine detection quality. If the detected marker pair has an acceptable score then the detected marker pair is used.

23 Claims, 12 Drawing Sheets

MARKER DETECTION IN X-RAY IMAGES

CROSS-REFERENCE TO RELATED APPLICATION

The present application is based on provisional application Ser. No. 61/256,082, filed Oct. 29, 2009, the entire contents of which are herein incorporated by reference.

BACKGROUND OF THE INVENTION

1. Technical Field

The present disclosure relates to X-ray images and, more specifically, to marker detection in X-ray images.

2. Discussion of Related Art

While certain types of X-ray studies such as high-resolution computed tomography (CT) scans can produce exceptionally sharp images in which many different types of matter can be distinguished, it may be difficult to accurately visualize soft tissue and other objects of low-density within conventional X-ray images. This may be especially true of x-ray fluoroscope images that capture a sequence of relatively low-energy x-ray images to provide a moving cine view.

X-ray fluoroscopy plays an important role in interventional imaging, where real-time image data is used to allow for the placement of various foreign objects such as stents and catheters within the circulatory system. During such procedures, radio-opaque contrast agents may be circulated within a patient's bloodstream so that arteries may be clearly visualized. However, in this high-contrast imaging environment it may be especially difficult to distinguish objects and structures other han the arteries within which the radio-opaque contrast agent flows.

In order to more clearly visualize objects such as stents and other objects used during the treatment of atherosclerotic stenosis, stents may be mounted to radio-opaque balloon markers, which may be deployed at both sides of the balloon catheter. Makers may be able to provide more accurate positioning of the stents, provided that the markers can be properly identified from the X-ray imagery. The process of marker identification is generally manually performed by medical practitioners involved in the intervention by careful examination of the imagery.

Identification of markers may play an important role for stent visualization. Accordingly, marker detection may be automated using computerized systems. Automated identification of markers may then be used to perforin automated identification of stents, as the location of the marker may be used to help identify the location of the stents that are marked. Automated identification of stents may then be used by computer aided diagnosis (CAD) systems or for other post-processing for stents. For example, automatic identification of stents may be used in performing stent enhancement, where the appearance of stents within X-ray imagery may be enhanced and signal to noise ratio increased.

In X-ray images, markers may appear circular or elliptical and their radii and axes may be determined by image resolution. Since image resolution is generally known in advance, the marker size is thus known for a given image. Other than knowledge of size and shape of a marker, there are no other special features or patterns that are generally used to help distinguish markers from other structures. In theory, markers have high contrast and unique shape, so they are intended for easy identification within X-ray images. However, for automatic computerized system in practice, it is actually difficult to accurately identify markers owing to factors such as interference from anatomical structures and artificial structures, and the low signal-to-noise ratio nature of fluoroscopy.

Additionally, manual annotation of markers within fluoroscope imagery may be labor intensive and may result in labeling inaccuracy as marker location identification often needs to be accurate to the order of sub-pixel precision.

SUMMARY

A method for detecting markers within X-ray images includes receiving an image sequence comprising a plurality of X-ray image frames. One or more directional filters are applied to the image sequence to provide respective strength of marker features for pixels of the image sequence. Each of the pixels of the image sequence is determined to be a marker candidate pixel when its respective strength of marker features exceeds a first predetermined threshold value. A determination is made as to which of the marker candidate pixels occur at substantially the same location within the greatest number of X-ray image frames of the image sequence. Pixels that have been determined to be marker candidate pixels are combined into one or more pixel clusters. Distances between each pixel cluster with respect to each of the other pixel clusters are computed. An average distance is determined from the computed distances. A first marker location is defined at a location of a pixel cluster from one or more of the clusters of contiguous pixels that includes the marker candidate pixels that have been determined to occur at substantially the same location within the greatest number of X-ray image frames and a second marker location is defined at a location of a pixel cluster from one or more of the clusters of contiguous pixels that is spaced from the first marker location by substantially the average distance.

The determined average distance between pixel clusters may serve as an estimated distance between markers within the image sequence. After combining the marker candidate pixels into one or more pixel clusters, clusters that are larger than a maximum cluster size or clusters that are smaller than a minimum cluster size may be rejected as false candidates and are not considered as clusters in subsequent steps.

A region of interest may be defined within the received image sequence and marker detection may be limited to the defined region of interest. Defining the region of interest may include summing pixel intensity values along columns of the image sequence, applying a band pass filter to detect discontinuity among the columns of summed pixel intensities, defining vertical bounds for the region of interest as the columns of detected discontinuity, summing pixel intensity values along rows of the image sequence, applying a band pass filter to detect discontinuity among the rows of summed pixel intensities, and defining horizontal bounds for the region of interest as the rows of detected discontinuity.

The one or more directional filters may each be applied in a direction of the corresponding directional filter.

Determining which of the marker candidate pixels occur at substantially the same location within the greatest number of X-ray image frames of the image sequence may include establishing a confidence function by determining how many frames a given marker candidate pixel occurs within a fixed neighborhood.

In computing the distance between pixel clusters, distance may be measured between respective centers of mass.

Determining an average distance from the computed distances may include finding the mode average of the distances. Computing the distance between each pixel cluster with respect to each of the other pixel clusters may include generating a distance histogram representing the distances between the pixel clusters and finding the mode average of the distances includes finding the distance associated with the peak of the histogram.

Markers may be detected at the first and second marker locations.

The method may additionally include determining that each of the pixels of the image sequence within a predetermined neighborhood of the first marker location is a second stage marker candidate pixel when its respective strength of marker features exceeds a second predetermined threshold value that is less than the first predetermined threshold value, combining the second stage marker candidate pixels into one or more second stage pixel clusters, determining a marker candidate score for each possible pairing of second stage pixel clusters, wherein the marker candidate score is indicative of a degree to which the pair of second stage pixel clusters resembles actual markers, and detecting markers at the locations of the pair of second stage pixel clusters that has the highest marker candidate score. The detected marker locations may be rejected when the highest marker candidate score is below a predetermined minimum acceptable score. The marker candidate score may be calculated based on distances between second stage pixel clusters.

Alternatively, or additionally, the maker candidate score may be calculated based on relative locations of the second stage pixel clusters within consecutive frames. Alternatively, or additionally, the maker candidate score may be calculated based on a degree to which the shape of the second stage pixel clusters resembles a profile template representing an expected marker shape. Alternatively, or additionally, the maker candidate score may be calculated based on a component size of the second stage pixel clusters. Alternatively, or additionally, the marker candidate score may be calculated based on the output of the one or more directional filters.

A method for detecting markers within X-ray images includes receiving an image sequence comprising a plurality of X-ray image frames, applying one or more directional filters to the image sequence, identifying a plurality of marker candidates based on the results of the directional filters, computing distance between all possible pairs of marker candidates, determining an average distance from the computed distances, detecting a first marker at a location of a marker candidate of the plurality of marker candidates that occurs at substantially the same location within the greatest number of X-ray image frames of the image sequence, and detecting a second marker at a location of a marker candidate of the plurality of marker candidates that is spaced from the first marker location by substantially the average distance.

Identifying the plurality of marker candidates based on the results of the directional filters may include determining that each of the pixels of the image sequence is a marker candidate pixel when its respective strength of marker features exceeds a first predetermined threshold value, and combining pixels that have been determined to be marker candidate pixels into one or more pixel clusters.

Computing the distance between all possible pairs of marker candidates may be performed with respect to the centers of mass of each marker candidate. Determining an average distance from the computed distances may include finding the mode average of the distances.

A computer system includes a processor and a non-transitory, tangible, program storage medium, readable by the computer system, embodying a program of instructions executable by the processor to perform method steps for detecting markers within X-ray images. The method includes receiving an image sequence comprising a plurality of X-ray image frames, applying one or more directional filters to the image sequence, identifying a plurality of marker candidates based on the results of the directional filters, computing distance between all possible pairs of marker candidates, determining an average distance from the computed distances, detecting a first marker at a location of a marker candidate of the plurality of marker candidates that occurs at substantially the same location within the greatest number of X-ray image frames of the image sequence, and detecting a second marker at a location of a marker candidate of the plurality of marker candidates that is spaced from the first marker location by substantially the average distance.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
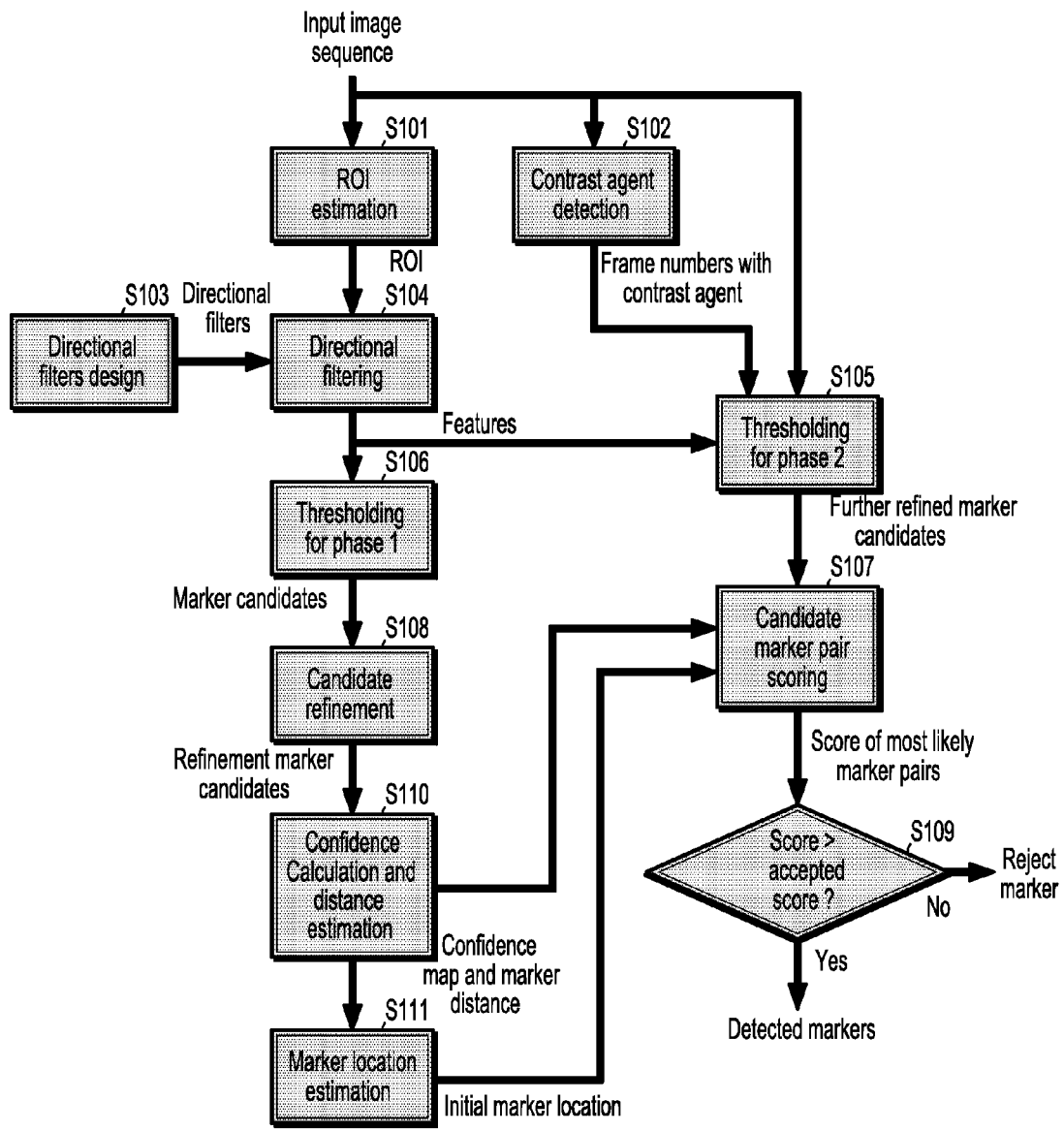
FIG. 1 is a flow chart illustrating an approach for detecting markers in x-ray images according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide an approach for automatic marker detection that may be based on features derived from directional filters. Thresholds for the directional features may be automatically estimated to reject most structures that may appear to be confusingly similar to markers. As a single image may not provide sufficient information to detect true markers due to strong interference and decoys, exemplary embodiments of the present invention may provide for the detection of only a single pair of marker in each frame of a given sequence of X-ray images, such as a fluoroscope cine sequence. The given sequence may be searched through and additional marker properties such as the approximate distance between two markers and the confidence of marker presence for each pixel may be established. Re-estimation of feature thresholds may be provided progressively and a score function may be designed that generates likelihood measures for all candidate marker pairs. The maximum score may establish the detection of true markers.

FIG. 1 is a flow chart illustrating an approach for detecting markers in x-ray images according to an exemplary embodiment of the present invention. A sequence of X-ray images may be taken as input. For example, the sequence of X-ray images may be a fluoroscope study that is used for guidance during an interventional procedure. Because many X-ray images contain borders that are very noisy, borders may be excluded to define a region of interest (ROI) for reliable detection and estimation (Step S101). After ROI detection, the images may be convolved with a bank of directional filters (Step S104). The directional filters may have been designed offline according to the marker model (Step S103). The output from the directional filters may indicate the strength of marker features in the direction of the corresponding directional filter. A thresholding scheme based on these features may be used to select a relatively small group of candidate markers (Step S106). An additional refinement of the candidate may be achieved by comparing the normalized candidate marker profiles with a pre-designed marker model (Step S108). The result may be an even smaller group of candidates. However, removal of still more candidates may be beneficial in reducing opportunities for false positive marker matched. When multiple images of a sequence are processed, refined candidates in each frame may then be used to calculate confidence and/or to estimate marker distance and location (Step S110). These processes are described herein as belonging to the first phase ("phase 1").

With the information obtained from the first phase, a second phase ("phase 2") of processing may be performed where a new thresholding scheme is employed (Step S105). For each candidate marker pair, a score may be calculated based on the distance between the two marker candidates of the pair, location relative to the previous detected marker pair, size, contrast, and confidence (Step S107). The pair with the best score and passes the score threshold may be defined as the target markers (Step S109).

Figure 2A:
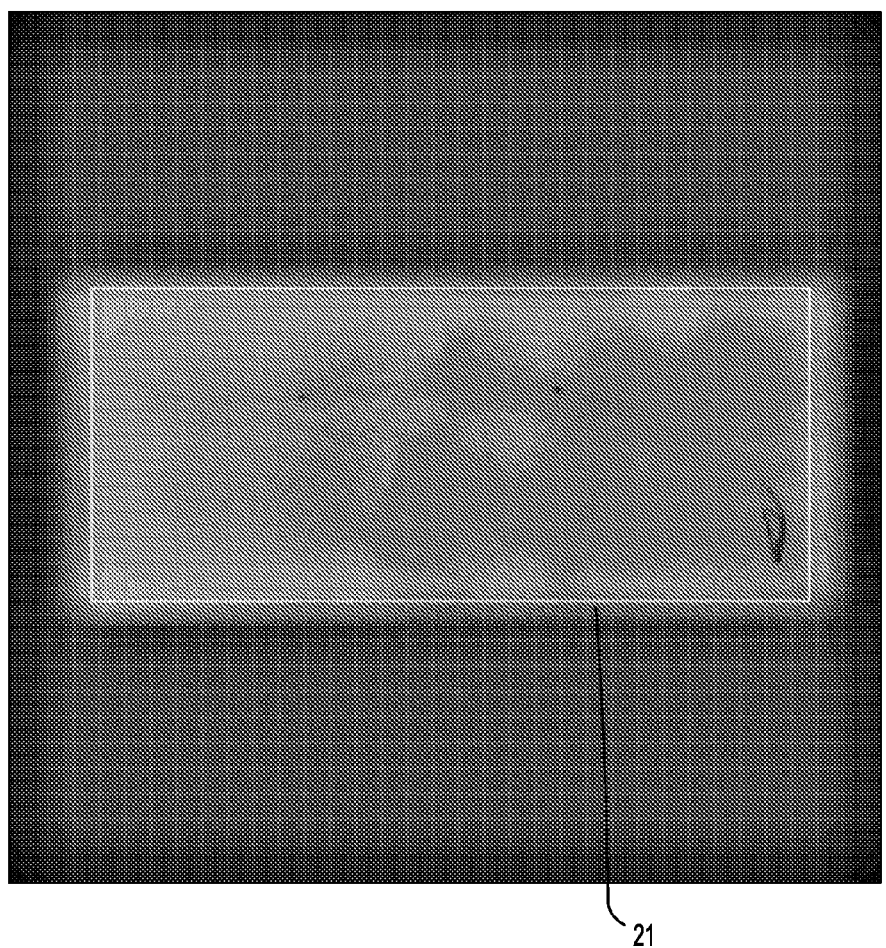
FIG. 2(a) is an exemplary image section illustrating the noisy and uninteresting margins of a typical X-ray image.
Figure 2B:
FIG. 2(b) is an exemplary X-ray image showing noisy and uninteresting margins with high-contrast lines of different scales that may lead to false marker detection.

FIG. 2(a) is an exemplary image section illustrating the noisy and uninteresting margins of a typical X-ray image. The borders between the image margins and the region of interest (ROI) 21 have high contrast that quickly transits from low to high intensities. These borders easily introduce false marker detection because they generally show strong response for band pass filters whose directions are not aligned with the borders. Exemplary embodiments of the present invention may make use of these characteristics to enable robust detection where a 1-D horizontal/vertical bandpass filter is applied along the vertical/horizontal direction. The mean filter response averaged over each direction would show the highest strength at the border pixels. With two strong points at the two ends of horizontal and vertical directions, a rectangular bounding box 22 may be determined as shown in FIG. 2(b). In FIG. 2(b), there are many high contrast lines of different scales present and these lines may easily leads to false marker detection where exemplary embodiments of the present invention are not employed.

In the X-ray images, the markers may appear as an undefined shape that may be roughly described as circular or elliptical with an arbitrary orientation. Assuming an elliptical model, the directions and lengths of the ellipse principle axes may be estimated. On the other hand, assuming a circular model may eliminate the need for estimation of directions and relative lengths. This may simplify filter design and detection criteria. However, a sole circular model may not provide satisfactory distinguish between true and false marker candidates.

Exemplary embodiments of the present invention may take modeling a step further and may analyze each pixel with a bank of bandpass directional filters that are rotated versions of a base filter (for example, a horizontal oriented filter). Accordingly, marker candidates, as approximately circular shapes, may exhibit similar strength responses from all oriented bandpass filters. This may be particularly useful in the case of a high contrast line because only one orientation would show weak response while other orientations may have responses that are well above those of a true marker. This type of lines usually has stronger response if a single circular match filter is used, as illustrated in the example image shown in FIG. 2(b).

Figure 3A:
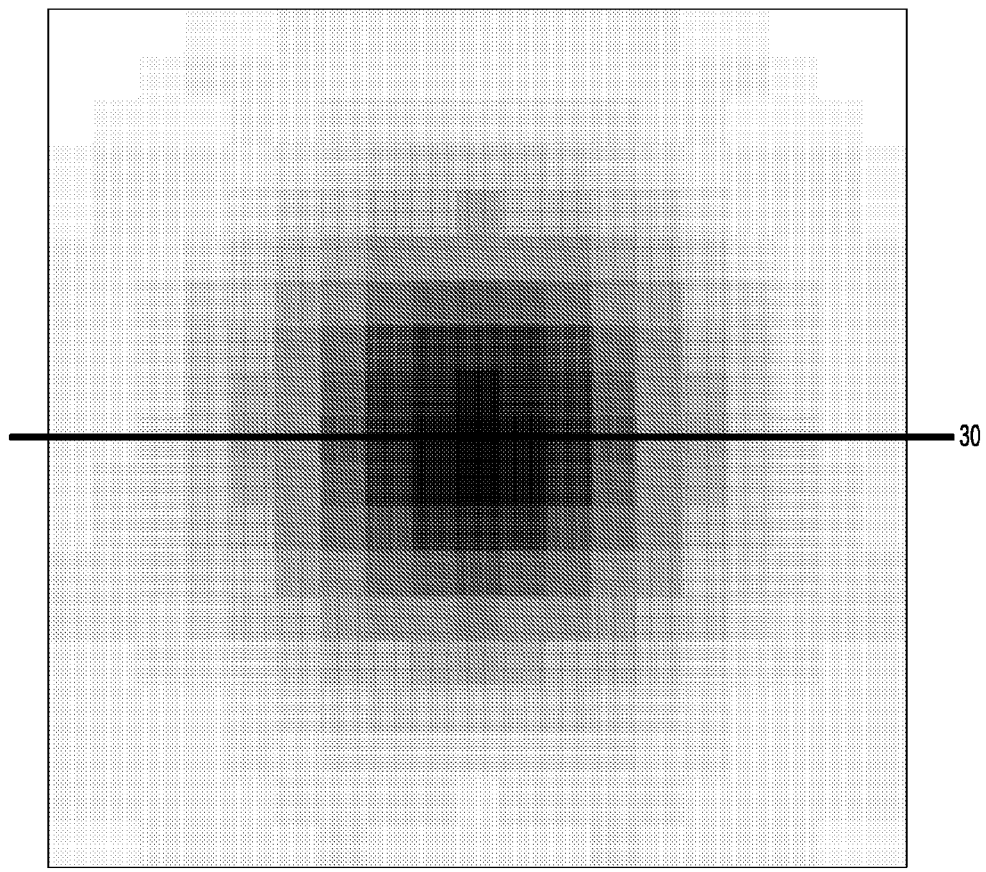
FIG. 3 (a) is an illustration of a marker template obtained from averaging a variety of markers according to an exemplary embodiment of the present invention.
FIG. 3(b) is a chart illustrating good correlation between the profile of FIG. 3(a) and a Laplacian of Gaussian function.
Figure 3B:
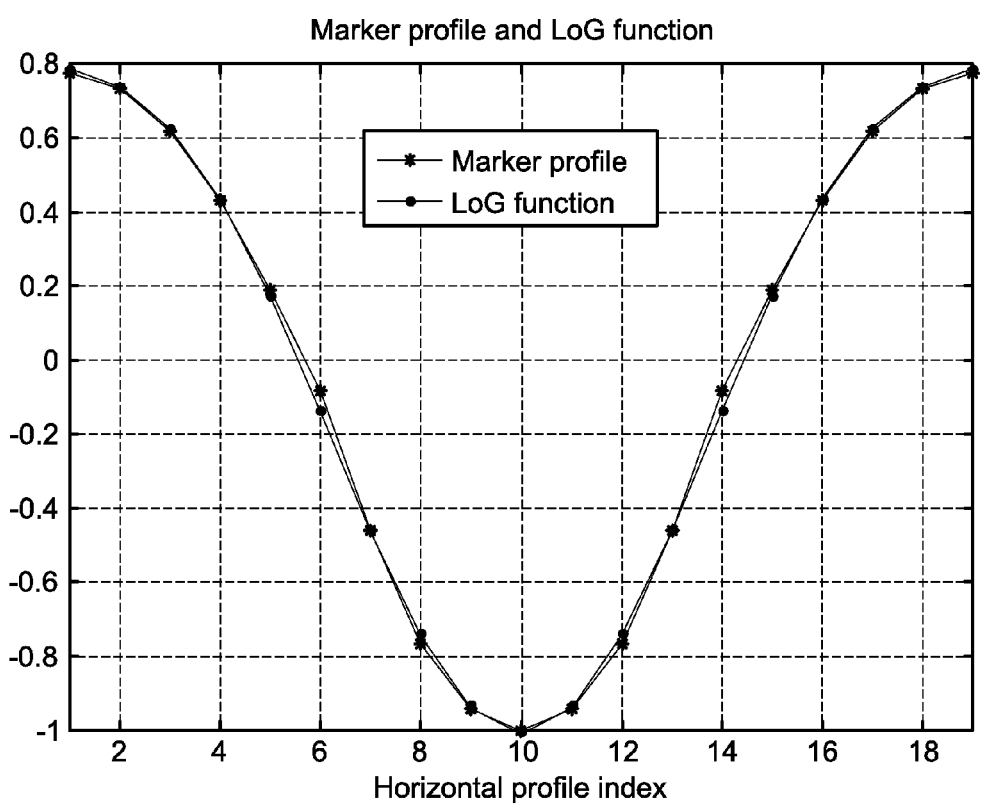

The design of the directional filters according to exemplary embodiments of the present invention may follow the principle of the matched filter, which is the optimal linear filter for maximizing the signal to noise ratio. In order to obtain the best correlation for the true markers, a variety of makers may be annotated by cutting a small window centered at the marker location in the image data and calculate an average over all these marker templates. An example of a final template according to an exemplary embodiment of the present invention is illustrated in FIGS. 3(a) and 3(b), where FIG. 3(a) is an illustration of a marker template obtained from averaging a variety of markers according to an exemplary embodiment of the present invention and FIG. 3(b) is a chart illustrating good correlation between the profile 30 of FIG. 3(a) and a Laplacian of Gaussian function. In FIG. 3(b) it may be seen that a Laplacian of Gaussian (LoG) function is a good fit to the marker profile, and hence may be treated as the model template. Therefore, directional filters according to exemplary embodiments of the present invention are designed by multiplying the 2-D LoG function h with a directional binary mask $m_i$, followed by a normalization to ensure the filter coefficients summed to 0. The input image may be convolved with a total of $d_n$ directional filters to generate features for subsequent marker detection. For example:

$$g_i = f \otimes h_i; h_i = h \cdot m_i$$

where f, and $g_i$, denote, respectively, the input and the output images after convolving f with the directional filter $h_i$; while $\otimes$ and * denote convolution and pixel-wise multiplication respectively. Here, i=0, ..., $d_n-1$, represents the orientation of the filter at $i*180/d_n$ degree. The average of $g_i$, denoted as $\bar{g}$, would be similar to the output of a circular matched filter.

Thresholding may be an effective scheme to select a group of candidate pixels that are to be further examined. Not only can thresholding accelerate the subsequent refinement processes, but it may also enable new criteria, such as the marker size, to reject false detection. Exemplary embodiments of the present invention seek to find an appropriate threshold because values at the higher end decrease detection rate while the lower values leave too many false positives. Exemplary embodiments of the present invention may utilize a sequential approach for finding a desired threshold where each stage is aimed for a relatively simple task.

In performing phase 1 thresholding (stepS106), a first threshold (T1) may be set to detect all pixels whose mean filter response $\bar{g}(x, y)$ are relatively strong. The binary output $b_{T1}$ may be expected to include large high contrast structures (e.g, the wires and part of catheters apparent in FIG. 2(b)). The connected components in $b_{T1}$ may then be computed and marker candidates whose size is larger than the maximum of all possible markers may be removed from consideration. The removed large structures may be recorded in a mask $m_L$. This step may be used to eliminate many potential false positives that have high contrast but belong to large structures that could not be markers.

A second threshold (T2) may then be applied to the feature $g_{min(x,y)} = \min\{g_i(x,y), i=0, \ldots, d_n-1\}$, which may be the minimum response among all directional filter outputs. Because the marker is assumed to be generally circular, as shown in FIG. 3(a), it may be expected that $g_{min(x,y)}$ should be reasonably high for a marker point. As high values of $g_{min(x,y)}$ are mostly removed in the previous thresholding step, T2 may be set aggressively to select few candidate marker pixels.

With sequential thresholding and the large structure removal schemes described above, there may still be more marker candidates than desired. However, exemplary embodiments of the present invention may further utilize the features of marker shape and size to discriminate true markers from false markers. This may be done, for example, using pixel-wise comparison between the candidate markers and the model template h explained in detail above. Because markers have different contrast due to different imaging condition, both the maker candidates and the template may be normalized so that they have the same minimum and maximum pixel values. Denoting the trial marker profile as $p_m$, the difference measure $d_p$ can be expressed as:

$$d_p = \sum_{x,y} \left| \hat{p}_m(x, y) - \hat{h}(x, y) \right|,$$

where $$\hat{p}_m(x, y) = \frac{\left( p_m(x, y) - \min_{\forall x, y}\{p_m(x, y)\} \right)}{\left( \min_{\forall x, y}\{p_m(x, y)\} - \min_{\forall x, y}\{p_m(x, y)\} \right)},$$

and $$\hat{h}(x, y) = \frac{\left( h(x, y) - \min_{\forall x, y}\{h(x, y)\} \right)}{\left( \min_{\forall x, y}\{h(x, y)\} - \min_{\forall x, y}\{h(x, y)\} \right)}.$$

A proper threshold for $d_p$ may be used to reject pixels whose neighborhoods do not appear to be markers. At this stage, connected components may be labeled to indicate that each connected component represents a potential marker with estimated size.

As steps S101, S103, S104, and S106 described above may provide an acceptable initial detection result, exemplary embodiments of the present invention may then refine the candidates by making use of the fact that marker candidates are detected within a sequence of images in step S108. As frame-to-frame marker motion may be relatively local as compared to the size of the image, knowledge about true markers may be accumulated by scanning through the sequence of images. Here, two additional features: confidence measure and marker distance, may be used to be further reduce marker candidates (Step S110).

Accordingly, marker candidates that occur at substantially the same location within the greatest number of X-ray image frames are more likely to represent true markers than candidates that are only present in a limited number of frames. However, as the location of marker candidates may change slightly from frame to frame, a marker candidate may be considered to be in substantially the same location if its change in location is relatively small with respect to the region of interest.

Calculation of the marker confidence may be performed from the refined marker candidates. Each detected pixel may be assigned a value based on the size of its connected point or its contrast measure $\bar{g}(x, y)$ to create a pre-confidence map $C_j$ for frame j. $C_s$ may be obtained by summing over $C_j$ and then a local averaging may be performed on $C_s$ to obtain a confidence map C.

Marker distance may be used as a powerful feature to exclude false positives because it does not depend on the structure contrast or size. Exemplary embodiments of the present invention may establish a distance histogram from multiple frames in the sequence. For each frame, the distance between all possible pairs may be evaluated and the distance may be weighed along with the detected size and contrast similarity between each marker pair. The weighting of each possible distance may be accumulated in the distance histogram. As the processing of the frames is completed, the distance where the peak is located in the histogram may be used as an estimate $\bar{d}$. Thus, the true marker pairs may be seen as the most consistently detected outcomes among the many frames, as compared to other randomly detected false positives.

As the true marker pairs may be seen as the most consistently detected distance between marker candidates, the estimated distance may be defined as the mode average of all the observed distances between pairs of marker candidates. However, the invention should not be limited to this particular embodiment as other approaches for calculating the estimated distances from the observed distances may be used. Other examples may include using the mean or median distance as the estimated distance.

Once the confidence map and the marker distance are determined (Step S110), two initial marker locations may be estimated (Step S111) by first locating the largest value in the confidence map C. This may be viewed as the first marker location $M_1$. A point of largest confidence may be established within a ring which is centered at $M_1$, and whose small and large radii are, respectively, $\hat{d}$-$\delta$ and. This may be viewed as the second marker location $M_2$. The value $\delta$ may account for distance estimation error.

In this way, sufficient features may be established to accurately detect true markers.

As contrast media can easily mask out the visibility of markers and create strong marker-like decoys, exemplary embodiments of the present invention may establish marker detection criteria more strictly for frames with contrast agents. For the application of stent visibility enhancement, a separate imaging procedure may be performed without any contrast agent in order to create a high SNR stent image. However, when applied more generally, an arbitrary sequence that may contain contrast agents might be administered. Therefore, a contrast agent recognition step (Step S102) may be optionally included in the above-described procedure to enhance marker detection.

When contrast media are present during interventional imaging, the vessel contrast is increased and become easily visible. As vessels are ridge type structures, we can perform ridge detection algorithm to detect the high contrast vessels. When compared with ridge detection outputs of the frames without contrast agents, we can see increased detection responses and thus find the frames where the contrast agents are present.

Given the estimated marker location and distance as determined from steps S110 and S111, the search for marker may be confined to a limited region. Accordingly, the thresholding for phase 2 (Step S105) may have relaxed criteria to increase detection rate. Using the notation described above, the criterion based on the directional filter output $g_i$ may be written as:

f(x,y) is a marker candidate if $$\left(\sum_{i=0}^{d_n-1} I\{g_i(x, y) > T_2\}\right) > d_n - 2 \text{ \&\& } g_{min}(x, y) > T_3$$

Here, $I\{\bullet\}$ is the indicator function taking value 1 if the condition inside the bracket is true and 0 otherwise; and $T_3$ ($<T_2$) is a threshold designed to reject line structures. This criterion states that the directional filter outputs allow weak responses from two directions; but the weakest response still needs to exceed $T_3$ in order to maintain the circular assumption.

As exemplary embodiments of the present invention may seek to identify only a single pair of markers, this knowledge may be used to establish a score measure that reflects the importance of each marker feature. As marker distance $\hat{d}$, locations in previous frames $(\hat{M}_1, \hat{M}_2)$, confidence C, and profile template $\hat{\pi}$ may be estimated in previous steps, the deviation of each candidate mark pair from these reference features may be used to determine whether each candidate is a true marker or a false candidate. In addition to these features, marker size A and contrast $\rho$ may also be taken into account. These features may reflect the visual perception for the frame in question. In general, the score measure can be any function that captures the relative importance of all these features. Exemplary embodiments of the present invention may utilize a function S that is a linear combination of each feature, weighted to adjust the relative importance:

$$S(p_1,p_2) = w_1\psi_1(d,\hat{d}) + w_2\psi_2(M_1,M_2,\hat{M}_1,\hat{M}_2) + w_3\psi_3(C) + \ldots w_4\psi_4(\pi,\hat{\pi}) + w_5\psi_5(A) + w_6\psi_6(\rho),$$

where $\psi_i$ and $w_i$, i=1, ..., 6 are, respectively, the scoring function and weighting for each feature; $(p_1, p_2)$ is the trial marker pair; and d, $(M_1, M_2)$, and $\pi$, are the trial marker distance, locations, and profile, respectively.

Exemplary embodiments of the present invention may utilize a simple scoring function that may be the inverse or negative of the deviation between the trial and reference features suffices to yield good results. The weighting may be trained based on the available data sets. Non-parametric classifiers may be devised that can learn from the labeled data. However, such a learning based approach is an optional feature of the present invention.

The marker pair that yields the highest score in step S107 may be selected as the most likely marker pair candidates. However, the penalty of any false positive in the target application may be severe as it may significantly degrade the stent visibility. Accordingly, to ensure that the selected marker pair candidates indeed represent the true marker, exemplary embodiments of the present invention may utilize the score measure S to accept or reject the selected candidate (Step S109). Detections may be rejected once S is below a trusted threshold, which may be different for frames with or without contrast agents. A high value may be set for frames with contrast agents as it is relatively easy to produce false positives in such a case.

Exemplary embodiments of the present invention may be applied to an X-ray sequence with an arbitrary number of frames, such as a fluoroscope study 38 X-ray sequences that contains 1784 frames. These sequences may varies significantly in their contrast, intensity range, marker motion, contents (varying high contrast artificial and anatomical structures), and noise levels. The proposed feature sets may be universal under these very different conditions. Using a tailor-made decision rule, good results may be achieved for just 1 or 2 sequences even if some of the markers are difficult to visualize. This is because special criteria can be employed to rule out strong decoys and enhance weak true marker. With the 38 data sets, there may be a relatively large number of exceptions that may complicate marker discovery when special detection rules are enforced.

Within the data sets, 8 sequences may contain contrast agents with roughly 260 frames. The results may be as high as 100% detection rate for the 1784−260=1524 frames that have no contrast agents. For sequences where the contrast agents cause the marker to be invisible to human eyes for about 60 frames, markers might not be detected. For the remaining 200 frames with contrast agents, the detection rate may be about 90%. The missing 10%, or about 20 frames, may mostly contain either perceptually ambiguous decoys or weak markers that are difficult even for human to observe.

Figure 4A:
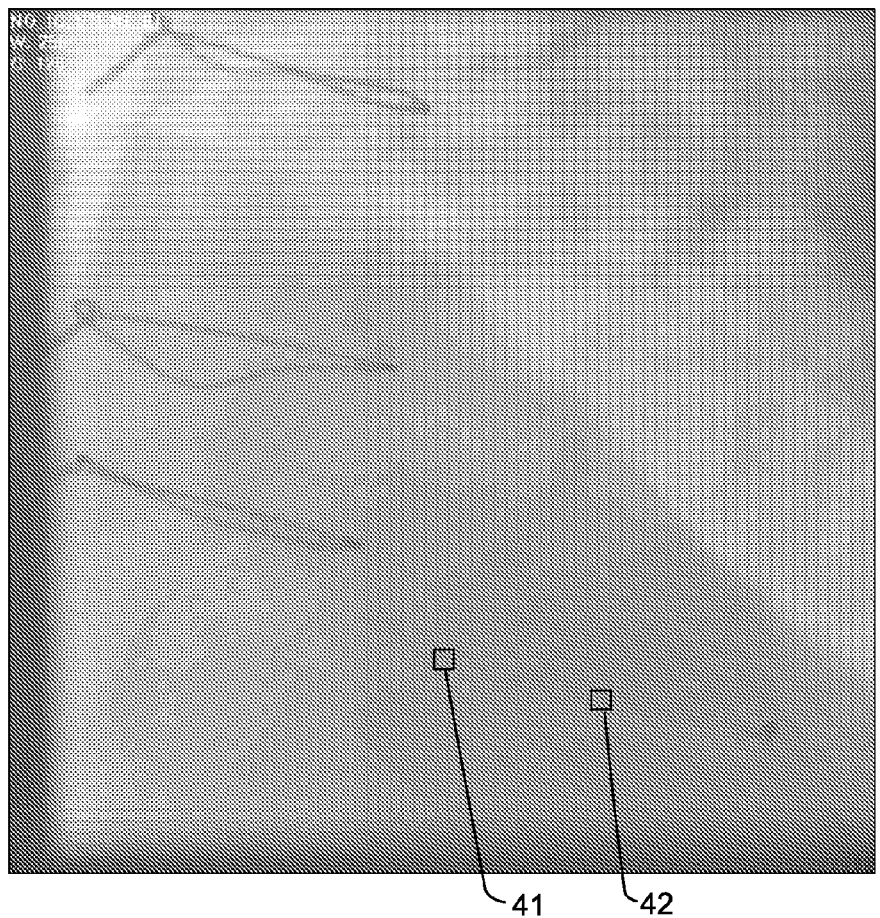
FIG. 4(a) demonstrates a sequence where the marker contrast is very low (weak contrast)
Figure 4B:
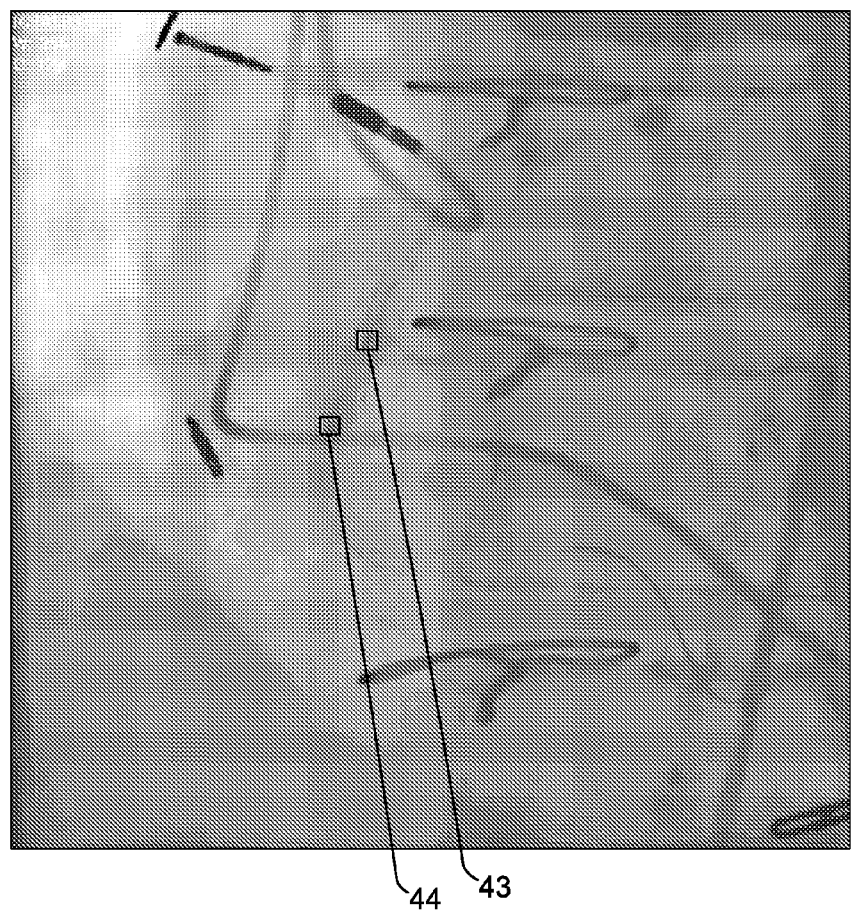
FIG. 4(b) illustrates the case where interfering structures occlude part of the markers (Strong interference)
Figure 5A:
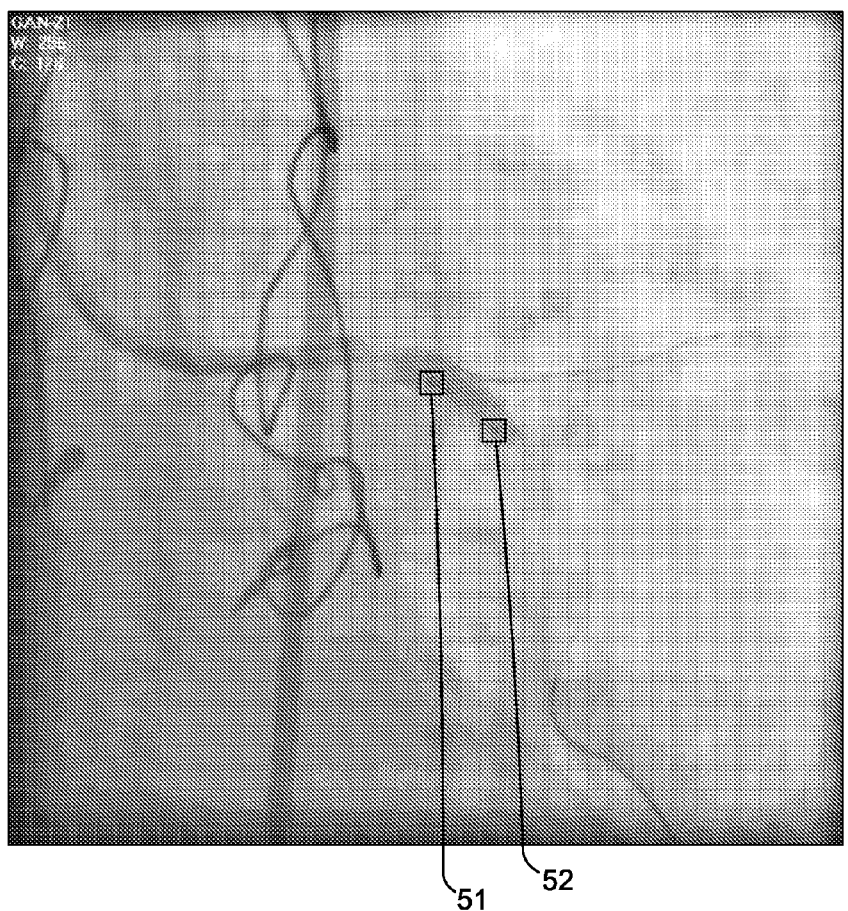
FIGS. 5(a) and (b) illustrate a sequence where the markers are more elongated ellipses than circles and a sequence with high noise level, respectively.
Figure 5B:
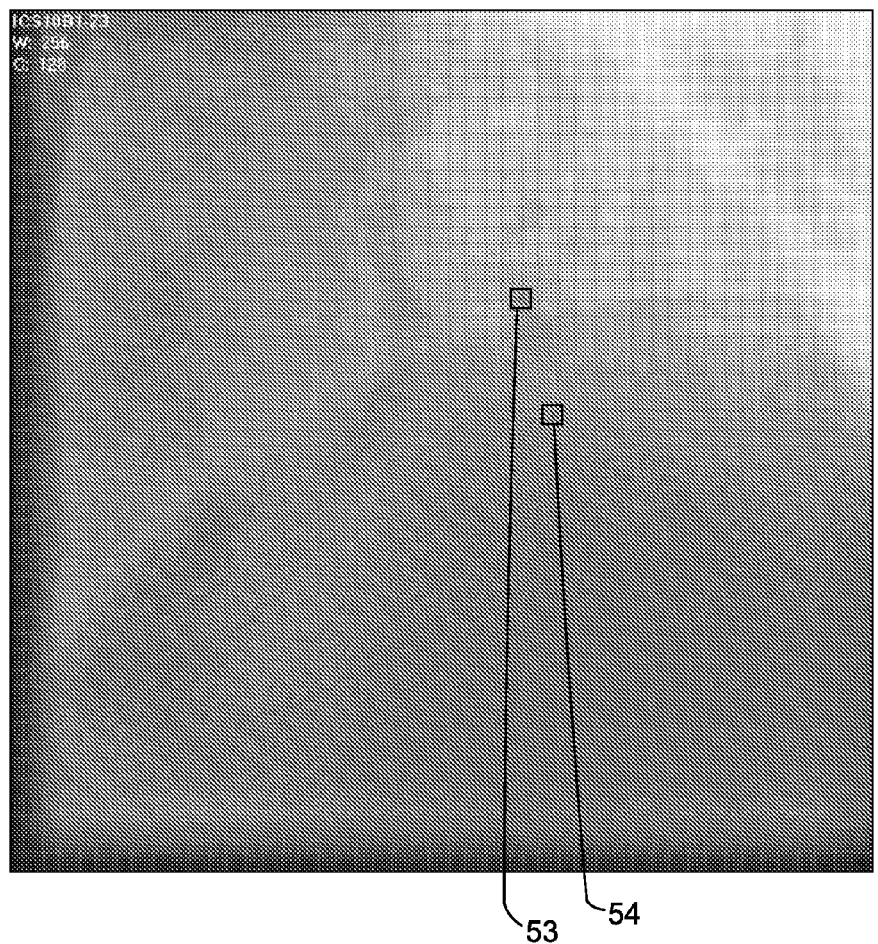

A few examples illustrating the large variation among different sequences are shown below. FIG. 4(a) demonstrates a sequence where the marker contrast is very low (weak contrast). Accordingly, the high contrast ring structures may be eliminated as well as the guide-wire tips. Then, a suitable threshold may be found for the true markers 41 and 42. FIG. 4(b) illustrates the case where interfering structures occlude part of the markers 43 and 44 (Strong interference). Using the two-phase decision procedure discussed above, the true markers 43 and 44 may be identified even when missed during the first phase. FIGS. 5(a) and (b) illustrate, respectively, a sequence where the markers 51 and 52 are more elongated ellipses than circles, and a sequence with high noise level. Here, the directional filter design may provide for features that are robust against these variations.

Figure 6A:
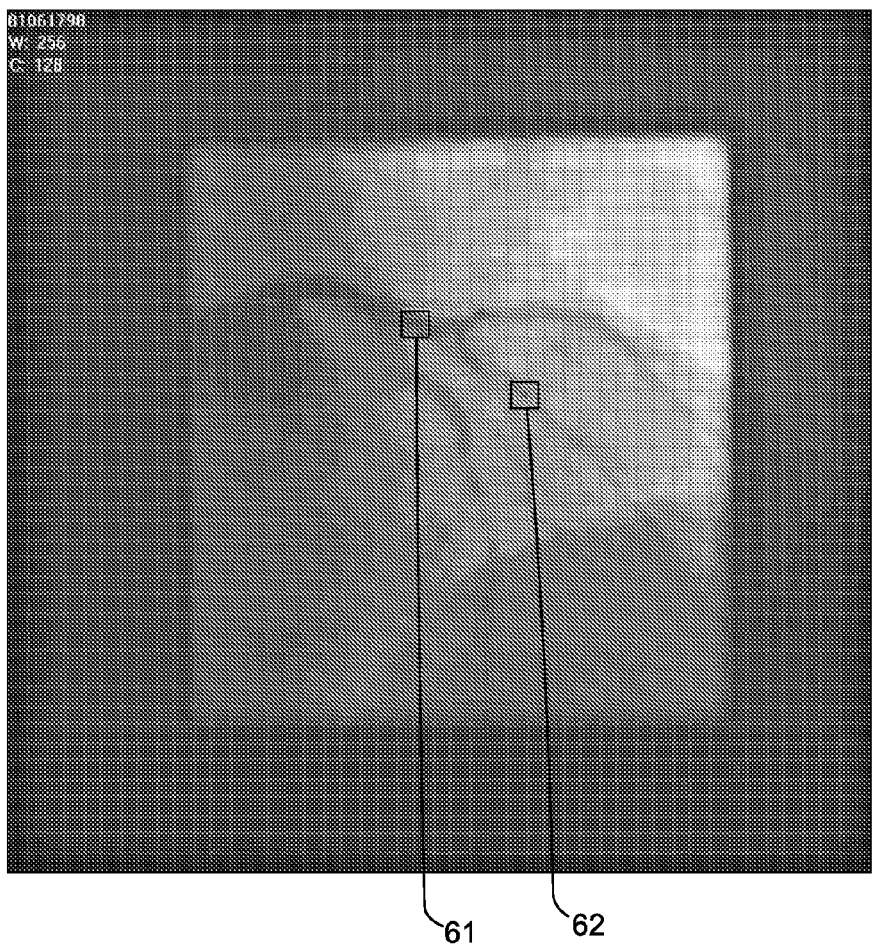
FIGS. 6(a) and (b) illustrate a case where the contrast agent interacts with the markers.
Figure 6B:

FIGS. 6(a) and (b) illustrate a case where the contrast agent interacts with the markers. In FIG. 6(a), even in the presence of contrast agents that may create circular decoys with high contrast, true markers 61 and 62 are identified based on all the computed and reference features. In FIG. 6(b), even trained human eyes might have difficulty recognizing the true marker locations. Moreover, there is strong ambiguity in the close neighborhood of the markers. Even with knowledge of the estimated reference features, it may be risky to trust the marker pair with the best score measure. The rejection criteria discussed above suitably may decide to ignore this frame to prevent false detection.

Figure 7:
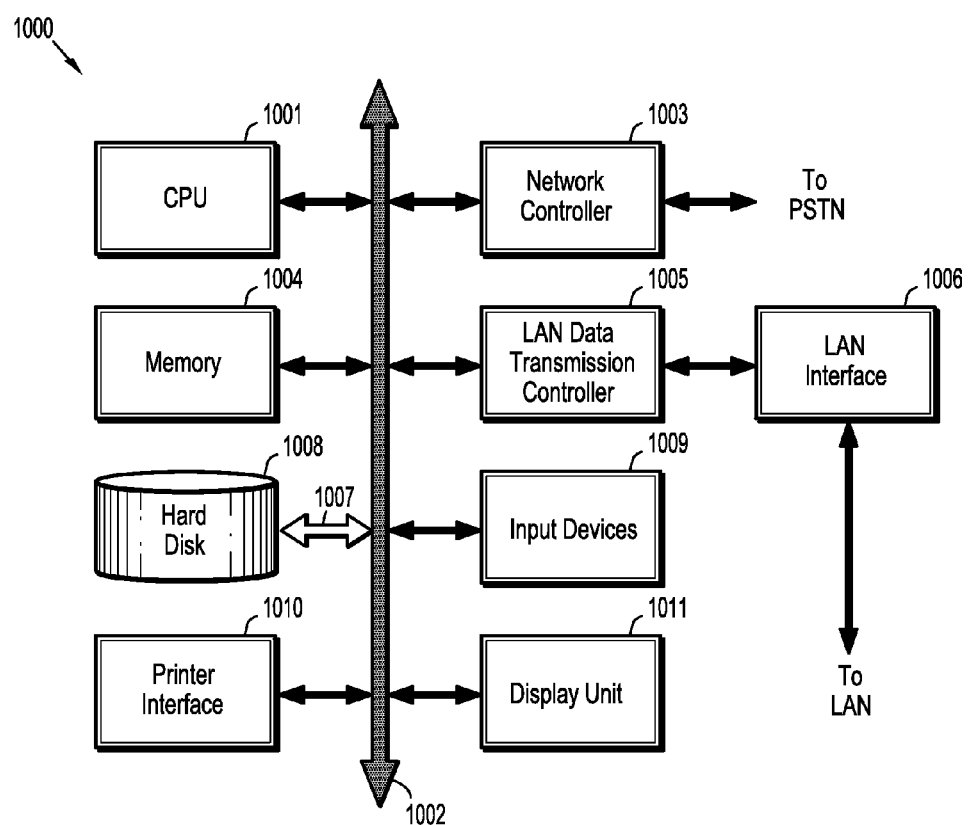
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for detecting markers within X-ray images, comprising:
    receiving an image sequence comprising a plurality of X-ray image frames;
    applying one or more directional filters to the image sequence to provide respective strength of marker features for pixels of the image sequence;
    determining that each of the pixels of the image sequence is a marker candidate pixel when its respective strength of marker features exceeds a first predetermined threshold value;
    determining which of the marker candidate pixels occur at substantially the same location within the greatest number of X-ray image frames of the image sequence;
    combining pixels that have been determined to be marker candidate pixels into one or more pixel clusters;
    computing distance between each pixel cluster with respect to each of the other pixel clusters;
    determining an average distance from the computed distances;
    defining a first marker location at a location of a pixel cluster from one or more of the clusters of contiguous pixels that includes the marker candidate pixels that have been determined to occur at substantially the same location within the greatest number of X-ray image frames; and
    defining a second marker location at a location of a pixel cluster from one or more of the clusters of contiguous pixels that is spaced from the first marker location by substantially the average distance.

2. The method of claim 1, wherein the determined average distance between pixel clusters serves as an estimated distance between markers within the image sequence.

3. The method of claim 1, wherein after combining the marker candidate pixels into one or more pixel clusters, clusters that are larger than a maximum cluster size or clusters that are smaller than a minimum cluster size are rejected as false candidates and are not considered as clusters in subsequent steps.

4. The method of claim 1, wherein a region of interest is defined within the received image sequence and marker detection is limited to the defined region of interest.

5. The method of claim 4, wherein defining the region of interest includes:
    summing pixel intensity values along columns of the image sequence;
    applying a band pass filter to detect discontinuity among the columns of summed pixel intensities;
    defining vertical bounds for the region of interest as the columns of detected discontinuity;
    summing pixel intensity values along rows of the image sequence;
    applying a band pass filter to detect discontinuity among the rows of summed pixel intensities; and
    defining horizontal bounds for the region of interest as the rows of detected discontinuity.

6. The method of claim 1, wherein the one or more directional filters are each applied in a corresponding direction.

7. The method of claim 1, wherein determining which of the marker candidate pixels occur at substantially the same location within the greatest number of X-ray image frames of the image sequence includes establishing a confidence function by determining how many frames a given marker candidate pixel occurs within a fixed neighborhood.

8. The method of claim 1, wherein in computing the distance between pixel clusters, distance is measured between respective centers of mass.

9. The method of claim 1, wherein determining an average distance from the computed distances includes finding the mode average of the distances.

10. The method of claim 9, wherein computing the distance between each pixel cluster with respect to each of the other pixel clusters includes generating a distance histogram representing the distances between the pixel clusters and finding the mode average of the distances includes finding the distance associated with the peak of the histogram.

11. The method of claim 1, wherein markers are detected at the first and second marker locations.

12. The method of claim 1, additionally comprising:
    determining that each of the pixels of the image sequence within a predetermined neighborhood of the first marker location is a second stage marker candidate pixel when its respective strength of marker features exceeds a second predetermined threshold value that is less than the first predetermined threshold value;
    combining the second stage marker candidate pixels into one or more second stage pixel clusters;
    determining a marker candidate score for each possible pairing of second stage pixel clusters, wherein the marker candidate score is indicative of a degree to which the pair of second stage pixel clusters resembles actual markers; and
    detecting markers at the locations of the pair of second stage pixel clusters that has the highest marker candidate score.

13. The method of claim 12, wherein the detected marker locations are rejected when the highest marker candidate score is below a predetermined minimum acceptable score.

14. The method of claim 12, wherein the marker candidate score is calculated based on distances between second stage pixel clusters.

15. The method of claim 12, wherein the maker candidate score is calculated based on relative locations of the second stage pixel clusters within consecutive frames.

16. The method of claim 12, wherein the maker candidate score is calculated based on a degree to which the shape of the second stage pixel clusters resembles a profile template representing an expected marker shape.

17. The method of claim 12, wherein the maker candidate score is calculated based on a component size of the second stage pixel clusters.

18. The method of claim 12, wherein the marker candidate score is calculated based on the output of the one or more directional filters.

19. A method for detecting markers within X-ray images, comprising:
    receiving an image sequence comprising a plurality of X-ray image frames;
    applying one or more directional filters to the image sequence;
    identifying a plurality of marker candidates based on the results of the directional filters;
    computing distance between all possible pairs of marker candidates;
    determining an average distance from the computed distances;
    detecting a first marker at a location of a marker candidate of the plurality of marker candidates that occurs at substantially the same location within the greatest number of X-ray image frames of the image sequence; and detecting a second marker at a location of a marker candidate of the plurality of marker candidates that is spaced from the first marker location by substantially the average distance.

20. The method of claim 19, wherein identifying the plurality of marker candidates based on the results of the directional filters includes:
   determining that each of the pixels of the image sequence is a marker candidate pixel when its respective strength of marker features exceeds a first predetermined threshold value; and
   combining pixels that have been determined to be marker candidate pixels into one or more pixel clusters.

21. The method of claim 19, wherein computing the distance between all possible pairs of marker candidates is performed with respect to the centers of mass of each marker candidate.

22. The method of claim 16, wherein determining an average distance from the computed distances includes finding the mode average of the distances.

23. A computer system comprising:
   a processor; and
   a non-transitory, tangible, program storage medium, readable by the computer system, embodying a program of instructions executable by the processor to perform method steps for detecting markers within X-ray images, the method comprising:
   receiving an image sequence comprising a plurality of X-ray image frames;
   applying one or more directional filters to the image sequence;
   identifying a plurality of marker candidates based on the results of the directional filters;
   computing distance between all possible pairs of marker candidates;
   determining an average distance from the computed distances;
   detecting a first marker at a location of a marker candidate of the plurality of marker candidates that occurs at substantially the same location within the greatest number of X-ray image frames of the image sequence; and
   detecting a second marker at a location of a marker candidate of the plurality of marker candidates that is spaced from the first marker location by substantially the average distance.

* * * * *